(12) United States Patent
Hamada

(10) Patent No.: US 8,118,273 B2
(45) Date of Patent: Feb. 21, 2012

(54) DISPLAY AND TELEVISION SET

(75) Inventor: Shingo Hamada, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 348 days.

(21) Appl. No.: 12/428,800

(22) Filed: Apr. 23, 2009

(65) Prior Publication Data
US 2009/0268108 A1 Oct. 29, 2009

(30) Foreign Application Priority Data

Apr. 23, 2008 (JP) ................................ 2008-112251

(51) Int. Cl.
A47G 29/00 (2006.01)

(52) U.S. Cl. .................. 248/371; 361/679.22; 248/922; 248/917

(58) Field of Classification Search .......... 248/917–923, 248/371, 349.1; 361/679.21, 679.22; 312/223.1, 312/223.2
See application file for complete search history.

(56) References Cited

U.S. PATENT DOCUMENTS

| 4,669,694 | A | * | 6/1987 | Malick | 248/397 |
| 4,790,504 | A | * | 12/1988 | Wills et al. | 248/183.2 |
| 6,665,175 | B1 | * | 12/2003 | deBoer et al. | 361/679.06 |
| 6,912,120 | B2 | * | 6/2005 | Kim et al. | 361/679.06 |
| 7,382,418 | B2 | | 6/2008 | Uchizono et al. | |
| 7,549,246 | B2 | * | 6/2009 | Kuo | 40/601 |
| 2003/0227739 | A1 | | 12/2003 | Kim et al. | |
| 2004/0217244 | A1 | | 11/2004 | Wu et al. | |
| 2006/0126283 | A1 | * | 6/2006 | Ho | 361/681 |
| 2007/0030410 | A1 | | 2/2007 | Cheng | |
| 2007/0090233 | A1 | * | 4/2007 | Choi | 248/122.1 |
| 2007/0215760 | A1 | * | 9/2007 | Sawai et al. | 248/122.1 |

FOREIGN PATENT DOCUMENTS

| EP | 0 071 451 A2 | 2/1983 |
| JP | 57-117192 U | 7/1982 |
| JP | 11-259011 A | 9/1999 |
| JP | 3105183 U | 10/2004 |
| JP | 2005-125471 A | 5/2005 |
| JP | 2006-64786 A | 3/2006 |

OTHER PUBLICATIONS

Japanese Office Action dated May 11, 2010 with English translation (seven (7) pages).
Japanese Office Action dated Apr. 19, 2011 including English-language translation (Four (4) pages).
Extended European Search Report dated Jun. 8, 2010 (Six (6) pages).

* cited by examiner

Primary Examiner — Basil Katcheves
Assistant Examiner — Beth Stephan
(74) Attorney, Agent, or Firm — Crowell & Moring LLP

(57) ABSTRACT

In a display, a housing is formed rotatably in an anteroposterior direction with respect to a base member about a rotation center provided above a bottom of the housing, and a projecting portion and a recess portion are so formed as to substantially block up a horizontal clearance formed between the housing and the base member in an anteroposterior rotational range of the housing.

12 Claims, 10 Drawing Sheets

DISPLAY AND TELEVISION SET

BACKGROUND OF THE INVENTION

1. Field of the Invention

The present invention relates to a display and a television set, and more particularly, it relates to a display and a television set each rotatable in an anteroposterior direction.

2. Description of the Background Art

A display such as a liquid crystal television set rotatable in an anteroposterior direction is known in general, as disclosed in Japanese Patent Laying Open Nos. 2006-64786 and 2005-128471 and Japanese Utility Model Registration No. 3106183, for example.

The aforementioned Japanese Patent Laying Open No. 2006-64786 discloses a liquid crystal display (display) comprising a liquid crystal panel (housing), a stand portion (base member) and an arm (support member). In this liquid crystal display (display), the arm (support member) supports a liquid crystal panel (housing) and is provided on an upper surface of a leg portion (base member). The liquid crystal panel (housing) is so formed as to be anteroposteriorly rotatable around the vicinity of a lower end of the arm (support member).

The aforementioned Japanese Patent Laying Open No. 2005-128471 discloses a liquid crystal television receiver (display) comprising a television receiver body (housing), a leg portion (base member) and a hinge (support member). In this liquid crystal television receiver (display), the hinge (support member) supports the vicinity of a bottom of the television receiver body (housing) and is provided on an upper surface of a leg portion (base member). The television receiver body (housing) is so formed as to be anteroposteriorly rotatable around the hinge (support member).

The aforementioned Japanese Utility Model Registration No. 3106183 discloses a liquid crystal display (display) comprising a cabinet (housing), a stand-side bracket (base member) and a rotating shaft (support member). In this liquid crystal display (display), the rotating shaft (support member) supports the cabinet (housing) and is provided on an upper surface of the stand-side bracket (base member). The cabinet (housing) is so formed as to be anteroposteriorly rotatable around the rotating shaft (support member).

In the liquid crystal display (display) described in Japanese Patent Laying Open No. 2006-64786, however, when the liquid crystal panel (housing) is rotated backward with respect to the stand portion (base member), a clearance is disadvantageously formed between a back surface in the vicinity of the lower end of the liquid crystal panel (housing) and a front surface of the stand portion (base member). When a user grasps the back surface in the vicinity of the lower end of the liquid crystal panel (housing) to rotate the same forward from this state, it is conceivable that a finger is disadvantageously caught in the clearance formed between the back surface in the vicinity of the lower end of the liquid crystal panel (housing) and the front surface of the stand portion (base member).

In the liquid crystal television receiver (display) described in Japanese Patent Laying Open No. 2005-128471, when the television receiver body (housing) is rotated backward with respect to the leg portion (base member), a clearance is disadvantageously formed between the back surface in the vicinity of the lower end of the television receiver body (housing) and the front surface of the leg portion (base member). When a user grasps the back surface in the vicinity of the lower end of the television receiver body (housing) to rotate the same forward from this state, it is conceivable that a finger is disadvantageously caught in the clearance formed between the back surface in the vicinity of the lower end of the television receiver body (housing) and the front surface of the leg portion (base member).

In the liquid crystal display (display) described in Japanese Utility Model Registration No. 3106183, when the cabinet (housing) is rotated backward with respect to the stand-side bracket (base member), a clearance is disadvantageously formed between the back surface in the vicinity of the lower end of the cabinet (housing) and the front surface of the stand-side bracket (base member). When a user grasps the back surface in the vicinity of the lower end of the cabinet (housing) to rotate the same forward from this state, it is conceivable that a finger is disadvantageously caught in the clearance formed between the back surface in the vicinity of the lower end of the cabinet (housing) and the front surface of the stand-side bracket (base member).

SUMMARY OF THE INVENTION

The present invention has been proposed in order to solve the aforementioned problems, and an object of the present invention is to provide a display and a television set each inhibiting a finger from being caught in a clearance formed between a housing and a base member when a user rotates the housing in an anteroposterior direction.

A display according to a first aspect of the present invention comprises a housing provided with a display portion and a base member, wherein one of the housing and the base member has a projecting portion, the other of the housing and the base member has a recess portion formed to be fitted with the projecting portion, the housing is formed rotatably in an anteroposterior direction with respect to the base member about a rotation center provided above a bottom of the housing, and the projecting portion and the recess portion are so formed as to substantially block up a horizontal clearance formed between the housing and the base member in an anteroposterior rotational range of the housing.

In this display according to the first aspect, as hereinabove described, the projecting portion and the recess portion are so formed as to substantially block up the horizontal clearance formed between the housing and the base member in the anteroposterior rotational range of the housing, whereby no clearance is substantially formed between the projecting portion and the front surface of the base member when the user rotates the housing in the anteroposterior direction with respect to the base member, also in a case where the rotation center of the housing is located above the bottom of the housing. Thus, the user's finger is not erroneously caught between the projecting portion and the front surface of the base member, and hence the finger can be inhibited from being caught in the clearance formed between the housing and the base member when rotating the housing in the anteroposterior direction with respect to the base member.

The aforementioned display according to the first aspect preferably further comprises a support member supporting the housing on a side of a front surface of the base member to be rotatable with respect to the base member, wherein the horizontal clearance formed between the housing and the base member is preferably blocked up by fitting the projecting portion into the recess portion when the housing is inclined forward, and the horizontal clearance formed between the housing and the base member is preferably substantially blocked up by locating a forward end of the projecting portion in the vicinity of a lower edge of the recess portion on a side of the projecting portion when the housing is inclined backward. According to this structure, the clearance can be easily inhibited from substantial formation between the projecting portion and the front surface of the base member when the user rotates the housing backward with respect to the base member, also in a case where the rotation center of the housing is located above the bottom of the housing.

In this case, a mounting portion for mounting the support member is preferably formed on an upper surface of a protrusion constituting an upper portion of the recess portion of the base member. According to this structure, the housing can be easily mounted on the base member through the support member.

In the aforementioned display according to the first aspect, the projecting portion is preferably integrally provided on the housing and includes a first rib portion protruding toward the base member, the recess portion is preferably provided on the base member so as to be fitted with the first rib portion of the housing, the horizontal clearance formed between the housing and the base member is preferably blocked up by fitting the first rib portion into a portion, corresponding to the first rib portion, of the recess portion in the anteroposterior rotational range of the housing when the housing is inclined forward, and the horizontal clearance formed between the housing and the base member is preferably substantially blocked up by locating a forward end of the first rib portion in the vicinity of a lower edge of the recess portion on a side of the first rib portion in the anteroposterior rotational range of the housing when the housing is inclined backward. According to this structure, the clearance can be easily inhibited from formation between the forward end of the first rib portion and the vicinity of the lower edge of the recess portion on the side of the first rib portion when the user rotates the housing backward with respect to the base member, also in a case where the rotation center of the housing is located above the bottom of the housing.

In the aforementioned display including the first rib portion, the first rib portion of the housing is preferably arcuately formed in the vicinity of the bottom of the housing, and a lower surface portion, corresponding to the first rib portion, of the recess portion of the base member is preferably arcuately formed. According to this structure, the first rib portion can be smoothly rotated with respect to the lower surface portion, corresponding to the first rib portion, of the recess portion in a state where the first rib portion and the lower surface portion, corresponding to the first rib portion, of the recess portion are separated from each other at a prescribed interval when the housing is rotated with respect to the base member.

In the aforementioned display including the first rib portion, the first rib portion and a lower surface portion, corresponding to the first rib portion, of the recess portion are preferably formed so as not to come into contact with each other in the anteroposterior rotational range of the housing. According to this structure, frictional resistance can be inhibited from occurring between the first rib portion and the lower surface portion, corresponding to the first rib portion, of the recess portion as compared with a case where the first rib portion and the portion, corresponding to the first rib portion, of the recess portion are in contact with each other, and hence the first rib portion can be smoothly rotated with respect to the portion, corresponding to the first rib portion, of the recess portion.

The aforementioned display including the first rib portion preferably further comprises a flat leg portion, wherein the base member provided with the recess portion is mounted on the leg portion. According to this structure, the base member provided with the recess portion can be stably set by the flat leg portion.

In the aforementioned display including the first rib portion, the projecting portion preferably further includes a second rib portion integrally provided with the housing and protruding in a direction perpendicular to the first rib portion, and the second rib portion is so formed as to block up a clearance formed on a lateral portion of the recess portion in the anteroposterior rotational range of the housing. According to this structure, no clearance is formed not only between the lower surface portion of the recess portion and the projecting portion but also lateral portions of the recess portion when the user rotates the housing in the anteroposterior direction. Thus, the finger can be inhibited from being caught in the clearance formed on the lateral portion of the recess portion when the user rotates the housing in the anteroposterior direction.

In this case, the clearance formed on the lateral portion of the recess portion is preferably blocked up by covering the lateral portion of the recess portion in the anteroposterior rotational range of the housing by the second rib portion when the housing is inclined forward, and the clearance formed on the lateral portion of the recess portion is preferably blocked up by locating an end of the second rib portion in the vicinity of an end of the recess portion in a width direction in the anteroposterior rotational range of the housing when the housing is inclined backward. According to this structure, the second rib portion can easily inhibit a clearance from formation on the lateral portion of the recess portion when the user rotates the housing in the anteroposterior direction with respect to the base member.

In the aforementioned display including the second rib portion, an inner side surface of the second rib portion and the lateral portion covered by the second rib portion of the recess portion are preferably formed so as not to come into contact with each other in the anteroposterior rotational range of the housing. According to this structure, frictional resistance can be inhibited from occurring between the inner side surface of the second rib portion and the lateral portion, covered by the second rib portion, of the recess portion as compared with a case where the inner side surface of the second rib portion and the lateral portion, covered by the second rib portion, of the recess portion are in contact with each other, and hence the second rib portion can be smoothly rotated with respect to the lateral portion, covered by the second rib portion, of the recess portion.

In the aforementioned display including the second rib portion, a length of the recess portion in a width direction is preferably smaller than a length between two of the second rib portions formed on first and second ends of the first rib portion respectively. According to this structure, the inner side surfaces of the second rib portions do not come into contact with the lateral portions, covered by the second rib portions, of the recess portion, and hence the second rib portions can be smoothly rotated with respect to the lateral portions, covered by the second rib portions, of the recess portion.

In the aforementioned display including the second rib portion, a lower portion of a forward end of the second rib portion is preferably rounded. According to this structure, it is possible to suppress that the user is injured when touching the second rib portion as compared with a case where the lower portion of the forward end of the second rib portion is formed in an angular shape.

In the aforementioned display including the second rib portion, the lateral portion of the recess portion is preferably opened, and the second rib portion is preferably so formed as to block up the clearance formed on the opened lateral portion of the recess portion in the anteroposterior rotational range of the housing. According to this structure, the second rib portion can easily inhibit the clearance from formation on the lateral portion of the recess portion.

In the aforementioned display including the second rib portion, the second rib portion is preferably so formed as to protrude vertically downward from a lower surface of the housing. According to this structure, the clearance can be inhibited from formation between the lower surface of the housing and the vicinity of the lateral portion of the recess portion.

In this case, the second rib portion and the lower surface of the housing may form an L-shape.

A television set according to a second aspect of the present invention comprises a display portion displaying a television image, a housing provided with the display portion and a base member, wherein one of the housing and the base member has a projecting portion, the other of the housing and the base member has a recess portion formed to be fitted with the projecting portion, the housing is formed rotatably in an anteroposterior direction with respect to the base member about a rotation center provided above a bottom of the housing, and the projecting portion and the recess portion are so formed as to substantially block up a horizontal clearance formed between the housing and the base member in an anteroposterior rotational range of the housing.

In this television set according to the second aspect, as hereinabove described, the projecting portion and the recess portion are so formed as to substantially block up the horizontal clearance formed between the housing and the base member in the anteroposterior rotational range of the housing, whereby no clearance is substantially formed between the projecting portion and the front surface of the base member when the user rotates the housing in the anteroposterior direction with respect to the base member, also in a case where the rotation center of the housing are located above the bottom of the housing. Thus, the user's finger is not erroneously caught between the projecting portion and the front surface of the base member, and hence the finger can be inhibited from being caught in the clearance formed between the housing and the base member when rotating the housing in the anteroposterior direction with respect to the base member.

The aforementioned television set according to the second aspect preferably further comprises a support member supporting the housing on a side of a front surface of the base member to be rotatable with respect to the base member, wherein the horizontal clearance formed between the housing and the base member is preferably blocked up by fitting the projecting portion into the recess portion when the housing is inclined forward, and the horizontal clearance formed between the housing and the base member is preferably substantially blocked up by locating a forward end of the projecting portion in the vicinity of a lower edge of the recess portion on a side of the projecting portion when the housing is inclined backward. According to this structure, the clearance can be easily inhibited from substantial formation between the projecting portion and the front surface of the base member when the user rotates the housing backward with respect to the base member, also in a case where the rotation center of the housing is located above the bottom of the housing.

In the aforementioned television set according to the second aspect, the projecting portion is preferably integrally provided on the housing and includes a first rib portion protruding toward the base member, the recess portion is preferably provided on the base member so as to be fitted with the first rib portion of the housing, the horizontal clearance formed between the housing and the base member is preferably blocked up by fitting the first rib portion into a portion, corresponding to the first rib portion, of the recess portion in the anteroposterior rotational range of the housing when the housing is inclined forward, and the horizontal clearance formed between the housing and the base member is preferably substantially blocked up by locating a forward end of the first rib portion in the vicinity of a lower edge of the recess portion on a side of the first rib portion in the anteroposterior rotational range of the housing when the housing is inclined backward. According to this structure, the clearance can be easily inhibited from formation between the forward end of the first rib portion and the vicinity of the lower edge of the recess portion on the side of the first rib portion when the user rotates the housing backward with respect to the base member, also in a case where the rotation center of the housing is located above the bottom of the housing.

In the aforementioned television set including the first rib portion, the first rib portion of the housing is preferably arcuately formed in the vicinity of the bottom of the housing, and a lower surface portion, corresponding to the first rib portion, of the recess portion of the base member is preferably arcuately formed. According to this structure, the first rib portion can be smoothly rotated with respect to the lower surface portion, corresponding to the first rib portion, of the recess portion, of the recess portion in a state where the first rib portion and the lower surface portion corresponding to the first rib portion are separated from each other at a prescribed interval when the housing is rotated with respect to the base member.

In the aforementioned television set including the first rib portion, the first rib portion and a lower surface portion, corresponding to the first rib portion, of the recess portion are formed so as not to come into contact with each other in the anteroposterior rotational range of the housing. According to this structure, frictional resistance can be inhibited from occurring between the first rib portion and the lower surface portion, corresponding to the first rib portion, of the recess portion as compared with a case where the first rib portion and the portion, corresponding to the first rib portion, of the recess portion are in contact with each other, and hence the first rib portion can be smoothly rotated with respect to the portion, corresponding to the first rib portion, of the recess portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
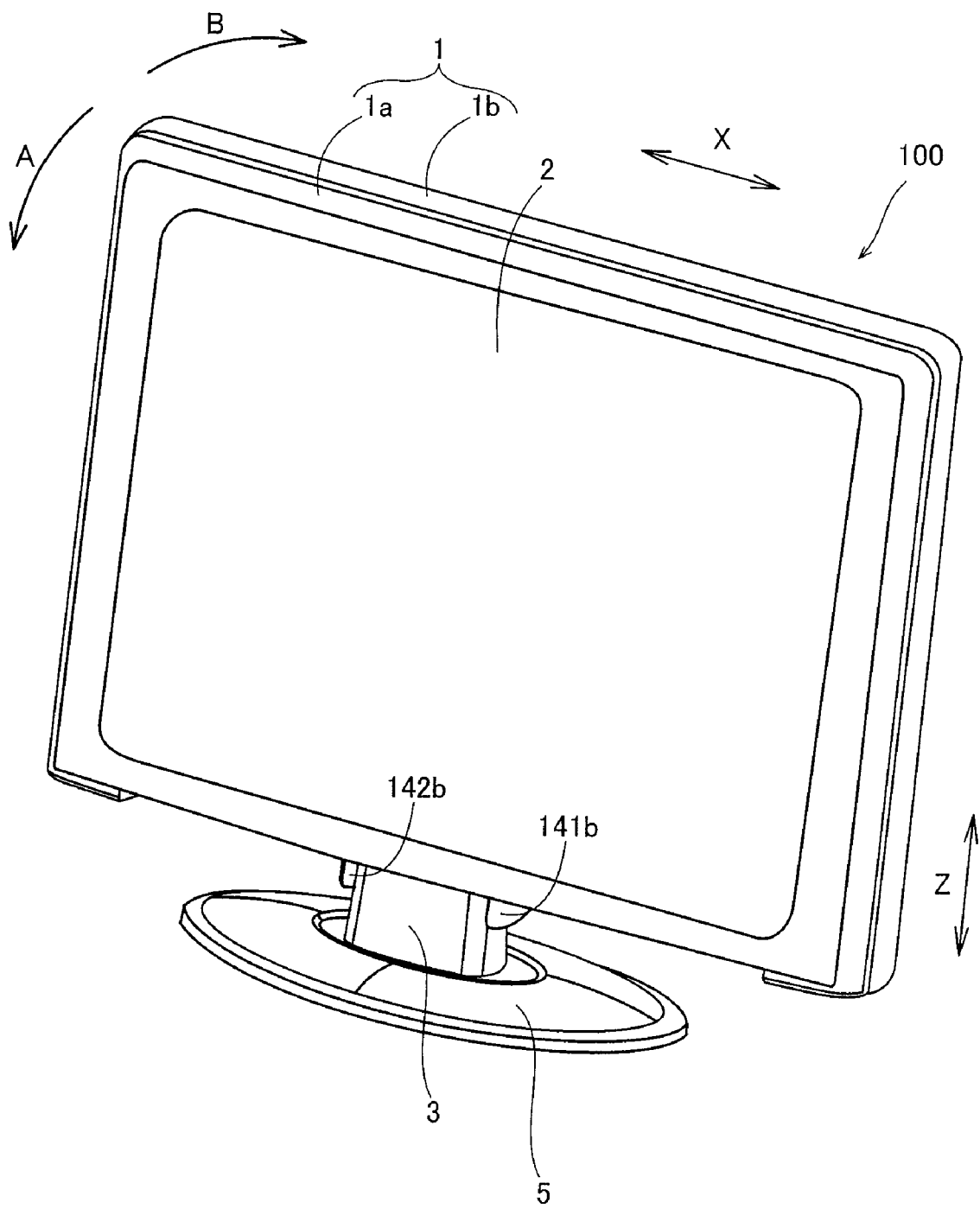
FIG. 1 is a perspective view showing an overall structure of a liquid crystal television set according to an embodiment of the present invention.

An embodiment of the present invention will be hereinafter described with reference to the drawings.

A structure of a liquid crystal television set 100 according to an embodiment of the present invention will be described with reference to FIGS. 1 to 15. The liquid crystal television set 100 is an example of the "display" in the present invention.

The liquid crystal television set 100 according to the embodiment of the present invention is constituted by a cabinet 1 constituted by a front cabinet 1a and a rear cabinet 1b made of resin, a display portion (liquid crystal module) 2 provided to be held between the front cabinet 1a and the rear cabinet 1b, a base member 3 made of resin, a support member 4 (see FIG. 3), and a leg portion 5 made of resin, arranged on a side of a lower surface of the base member 3. The cabinet 1 is an example of the "housing" in the present invention.

Figure 2:
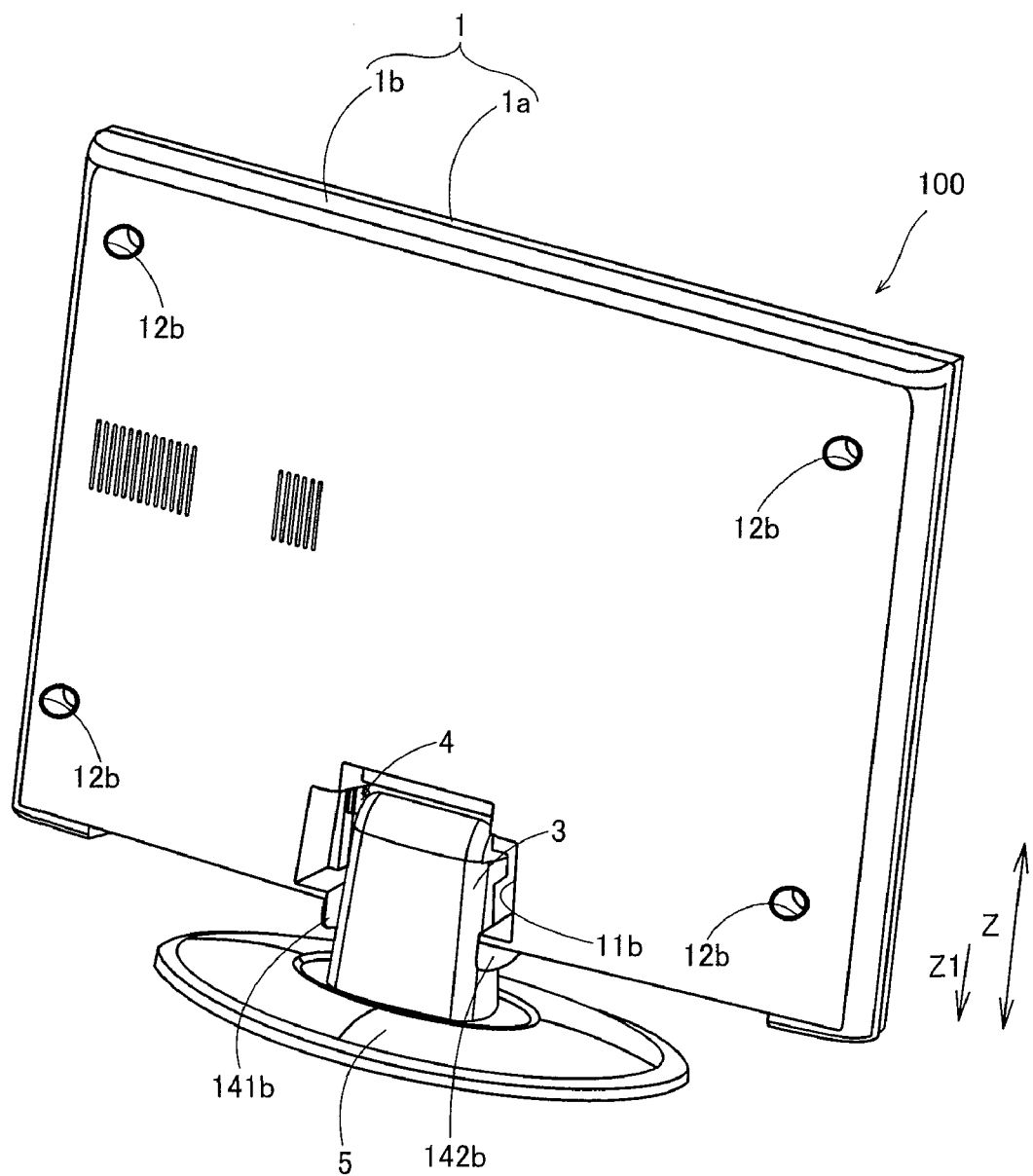
FIG. 2 is another perspective view showing the overall structure of the liquid crystal television set according to the embodiment of the present invention.

The front cabinet 1a made of resin has a square shape and is in the form of a frame, as shown in FIG. 1. The rear cabinet 1b made of resin has a square shape, as shown in FIG. 2. Support member mounting portions 112 are so formed in the vicinity of a lower end of the rear cabinet 1b as to be mounted with a support member 3. Screw mounting holes 12b are formed on a peripheral portion of the rear cabinet 1b.

According to this embodiment, a rib portion 13b having an arcuate shape in a direction Z is formed in the vicinity of a bottom (side along arrow Z1) on a side of a back surface of the rear cabinet 1b of the cabinet 1, as shown in FIGS. 5 and 10 to 15. The rib portion 13b is an example of the "projecting portion" or the "first rib portion" in the present invention. This rib portion 13b is integrally provided with the rear cabinet 1b of the cabinet 1. The rib portion 13b is so provided as to protrude toward the base member 3 (along arrow Y2).

Figure 5:
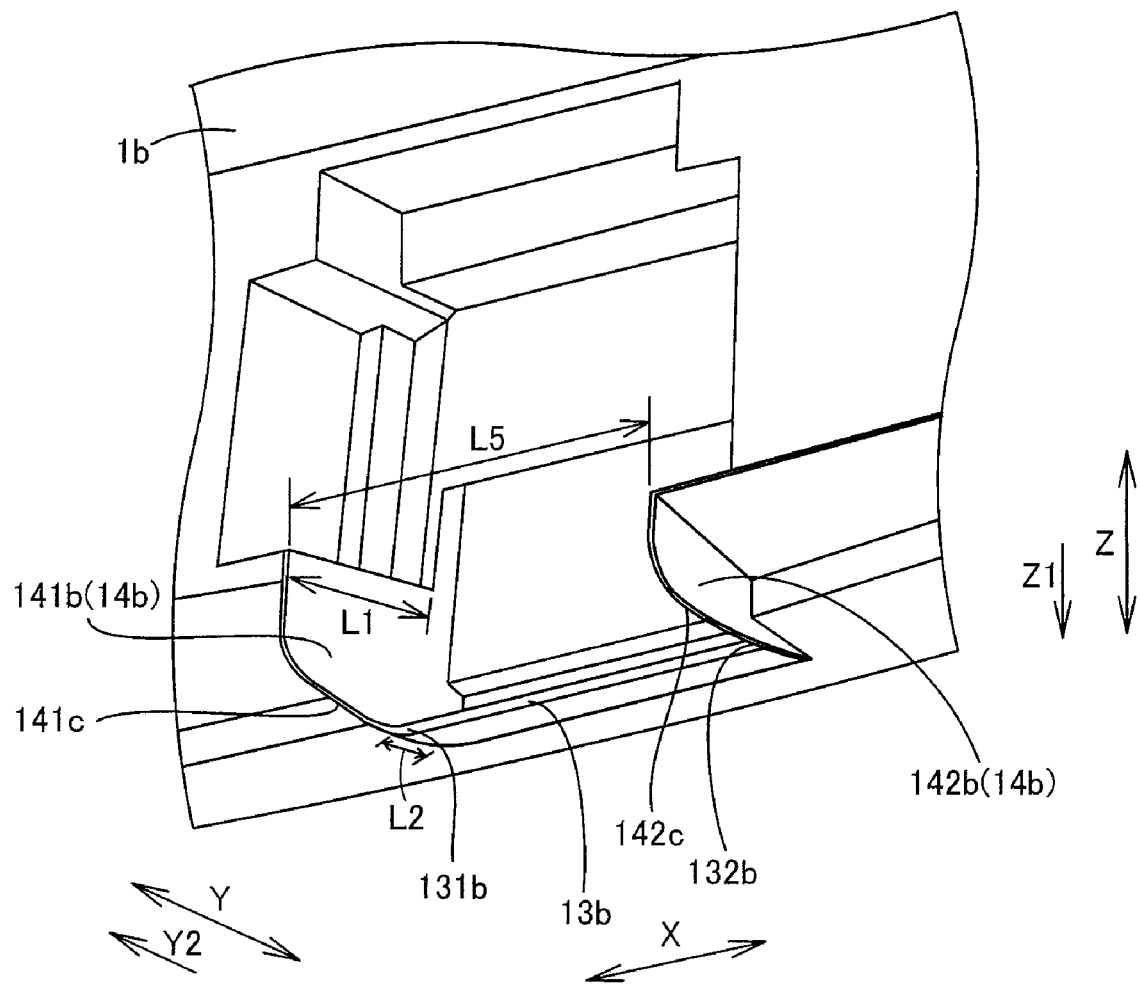
FIG. 5 is a perspective view showing rib portions of the cabinet of the liquid crystal television set according to the embodiment of the present invention.

According to this embodiment, the two rib portions 14b of the cabinet 1 are integrally provided with the rear cabinet 1b of the cabinet 1, as shown in FIG. 5. The two rib portions 14b are examples of the "projecting portion" or the "second rib portion" in the present invention. The two rib portions 14b are so provided as to protrude in a direction perpendicular to the rib portion 13b (a side along arrow Y2). Lower portions (141c and 142c) of forward ends of the rib portions 14b (141b and 142b) are rounded. As shown in FIG. 2, the rib portions 14b are so formed as to protrude vertically downward (a side along arrow Z1) from a lower surface of the cabinet 1. The cabinet 1 and the rib portions 14b are formed to have an L-shape as viewed from a side of a front surface (or a side of a back surface). The two rib portions 14b are formed by the rib portion 141b and the rib portion 142b. The two rib portions 141b and 142b are integrally formed with a first end 131b and a second end 132b of the rib portion 13b in a direction X respectively. A length L1 of each of the rib portions 141b and 142b in a direction Y is larger than a length L2 of the rib portion 13b in a direction Y.

Figure 3:
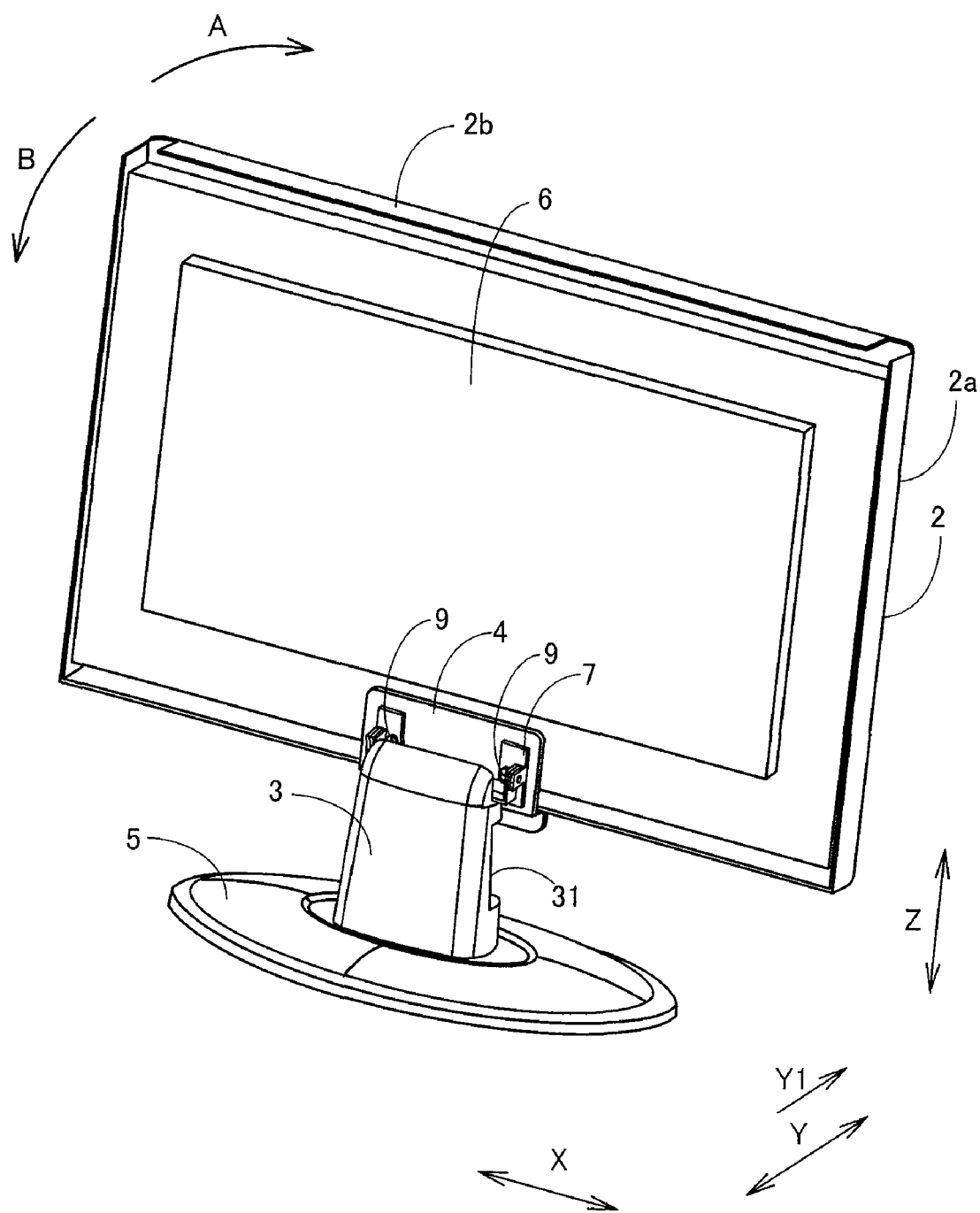
FIG. 3 is a perspective showing the liquid crystal television set with a cabinet removed according to the embodiment of the present invention.

The display portion (liquid crystal module) 2 includes a liquid crystal panel 2a provided on a side of a front surface and a frame 2b made of metal provided to cover the liquid crystal panel 2a, as shown in FIG. 3. A printed circuit board 6 is provided on a side of a back surface of the display portion 2. This printed circuit board 6 is mounted with electronic components for operating the liquid crystal television set 100.

Figure 6:
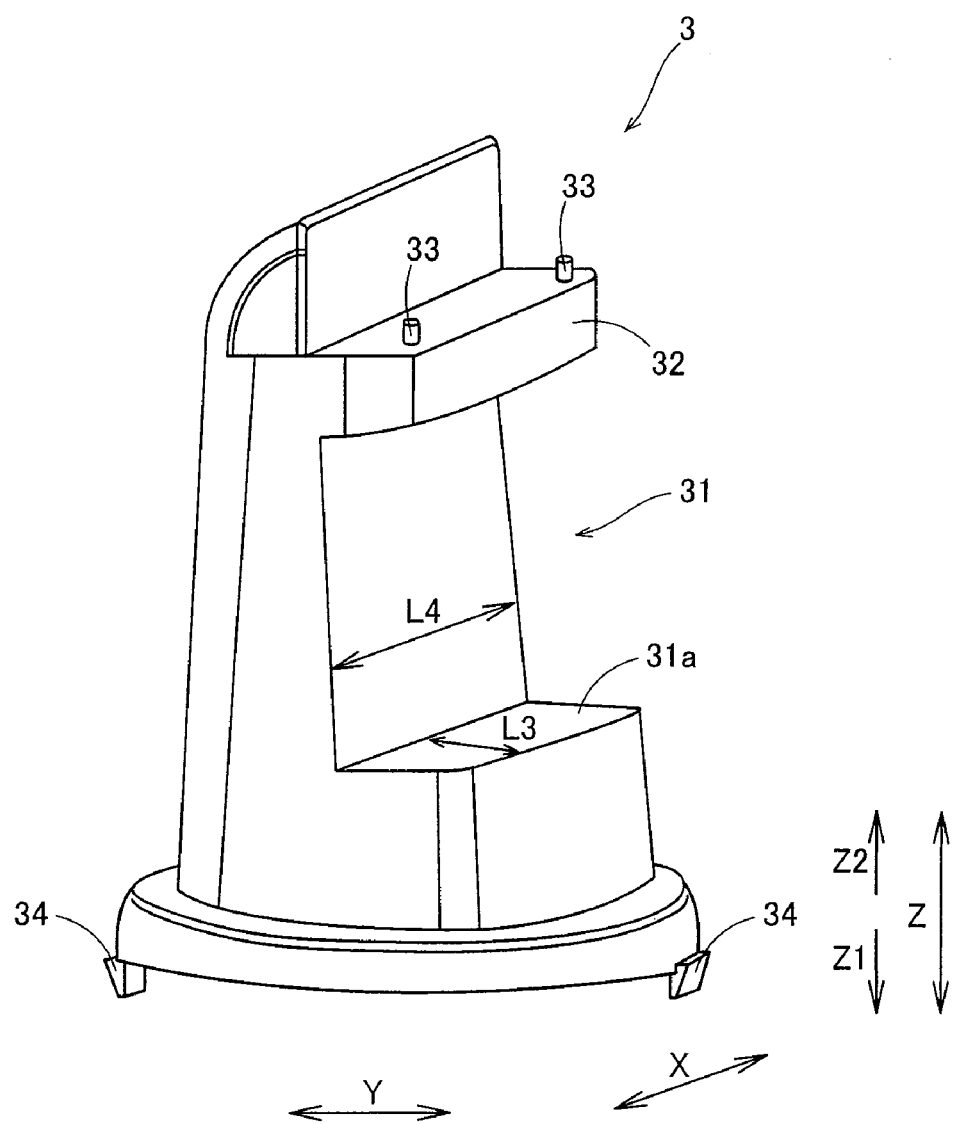
FIG. 6 is a perspective view showing the base member of the liquid crystal television set according to the embodiment of the present invention.

According to this embodiment, a recess portion 31 is formed on the base member 3 made of resin so as to be fitted with the rib portion 13b (see FIG. 5) of the cabinet 1, as shown in FIG. 6. This recess portion 31 has a U-shape as viewed from the direction X. Lateral portions (in the direction X) of the recess portion 31 are opened. A lower surface portion 31a corresponding to the rib portion 13b is formed on a surface, extending along arrow Z1, of the recess portion 31. This lower surface portion 31a corresponding to the rib portion 13b is so formed as to have an arcuate shape projecting along arrow Z1. The lower surface portion 31a is so formed that a length L3 of the lower surface portion 31a corresponding to the rib portion 13b in the direction Y is smaller than a length L4 of the recess portion 31 in the direction X. The rib portion 13b is so formed that a length L3 of the lower surface portion 31a corresponding to the rib portion 13b in the direction Y is larger than the length L2 (see FIG. 5) of the rib portion 13b of the rear cabinet 1b in the direction Y. The recess portion 31 is so formed that the length L4 of the recess portion 31 in the direction X is smaller than a length (interval) L5 (see FIG. 5) between the rib portions 141b and 142b of the rear cabinet 1b.

According to this embodiment, a lower surface portion 133b of the rib portion 13b is formed so as not to come into contact with the lower surface portion 31a, corresponding to the rib portion 13b, of the recess portion 31 of the base member 3 in an anteroposterior rotational range (along arrows A and B) of the cabinet 1, as shown in FIGS. 10 to 15. At this time, a length interval L6 between the lower surface portion 133b of the rib portion 13b and the lower surface portion 31a corresponding to the rib portion 13b is a length (about 1 mm) not to catch a user's finger. Inner side surfaces of the two rib portions 141b and 142b and the lateral portions, covered by the two rib portions 141b and 142b, of the recess portion 31 are formed so as not to come into contact with each other in the anteroposterior rotational range (along arrows A and B) of the cabinet 1. As shown in FIG. 6, a pair of columnar fixed member mounting portions 33 for mounting the support member 4 is formed on an upper surface of a projecting portion 32 constituting an upper portion of the base member. The projecting portion 32 is an example of the "protrusion" in the present invention, and the fixed member mounting portions 33 are examples of the "mounting portion" in the present invention. These fixed member mounting portions 33 are so provided as to protrude along arrow Z2 from an upper surface of the projecting portion 32. Pawls 34 are provided on a lower portion of the base member 3. The pawls 34 of the base member 3 are so formed as to be mounted on the leg portion 5.

Figure 7:
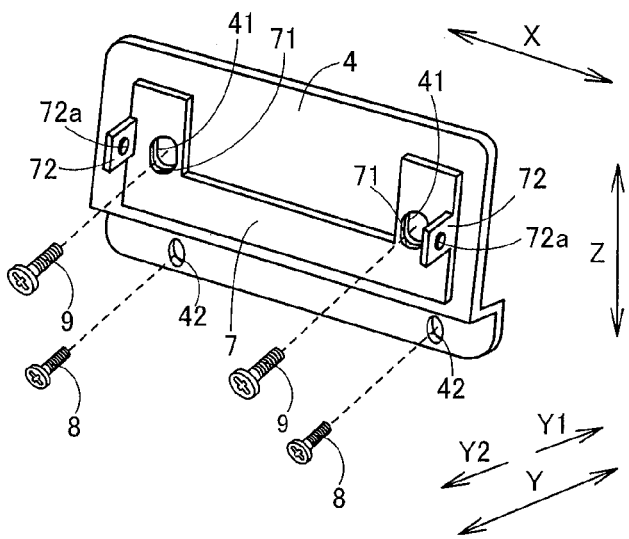
FIG. 7 is a perspective view showing the support member and a sheet metal member of the liquid crystal television set according to the embodiment of the present invention.
Figure 8:
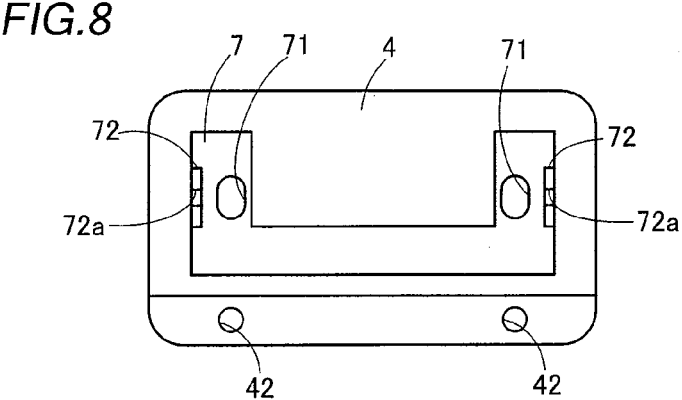
FIG. 8 is a plan view showing the support member and the sheet metal member of the liquid crystal television set according to the embodiment of the present invention.
Figure 9:
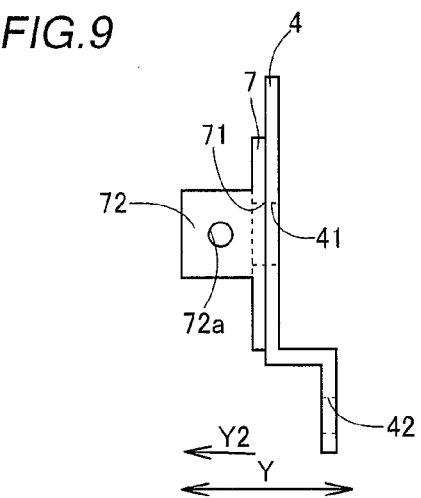
FIG. 9 is a side elevational view showing the support member and the sheet metal member of the liquid crystal television set according to the embodiment of the present invention.

The support member 4 has a substantially square shape as viewed from the front surface (side along arrow Y1) and has a substantially L-shape as viewed from lateral portions (direction X), as shown in FIGS. 7 to 9. The support member 4 is formed with two screw receiving holes 41 for mounting a sheet metal member 7, described later, on the display portion 2 through the support member 4 and two screw receiving holes 42 for mounting the support member 4 on the front cabinet 1a of the display portion 2. Screws 8 (see FIG. 7) are so formed as to be mounted on the front cabinet 1a through the screw receiving holes 42 of the support member 4.

The sheet metal member 7 is provided on the support member 4 on the side along side along arrow Y2. This sheet metal member 7 has a U-shape as viewed from the front surface (side along arrow Y1). Two screw receiving holes 71 are formed in the direction Y on the sheet metal member 7. The screw receiving holes 71 and the screw receiving holes 41 of the support member 4 are so arranged as to overlap with each other as viewed from the front surface (side along arrow Y1). Two projecting portions 72 are so formed on ends of the sheet metal member 7 in the direction X as to protrude along arrow Y2 with respect to the sheet metal member 7. These projecting portions 72 are formed with rotating shaft receiving holes 72a in the direction X. Screws 9 (see FIGS. 10 to 15) are so formed as to be mounted on the display portion 2 through the screw receiving holes 71 and the screw receiving holes 41 of the support member 4.

Figure 4:
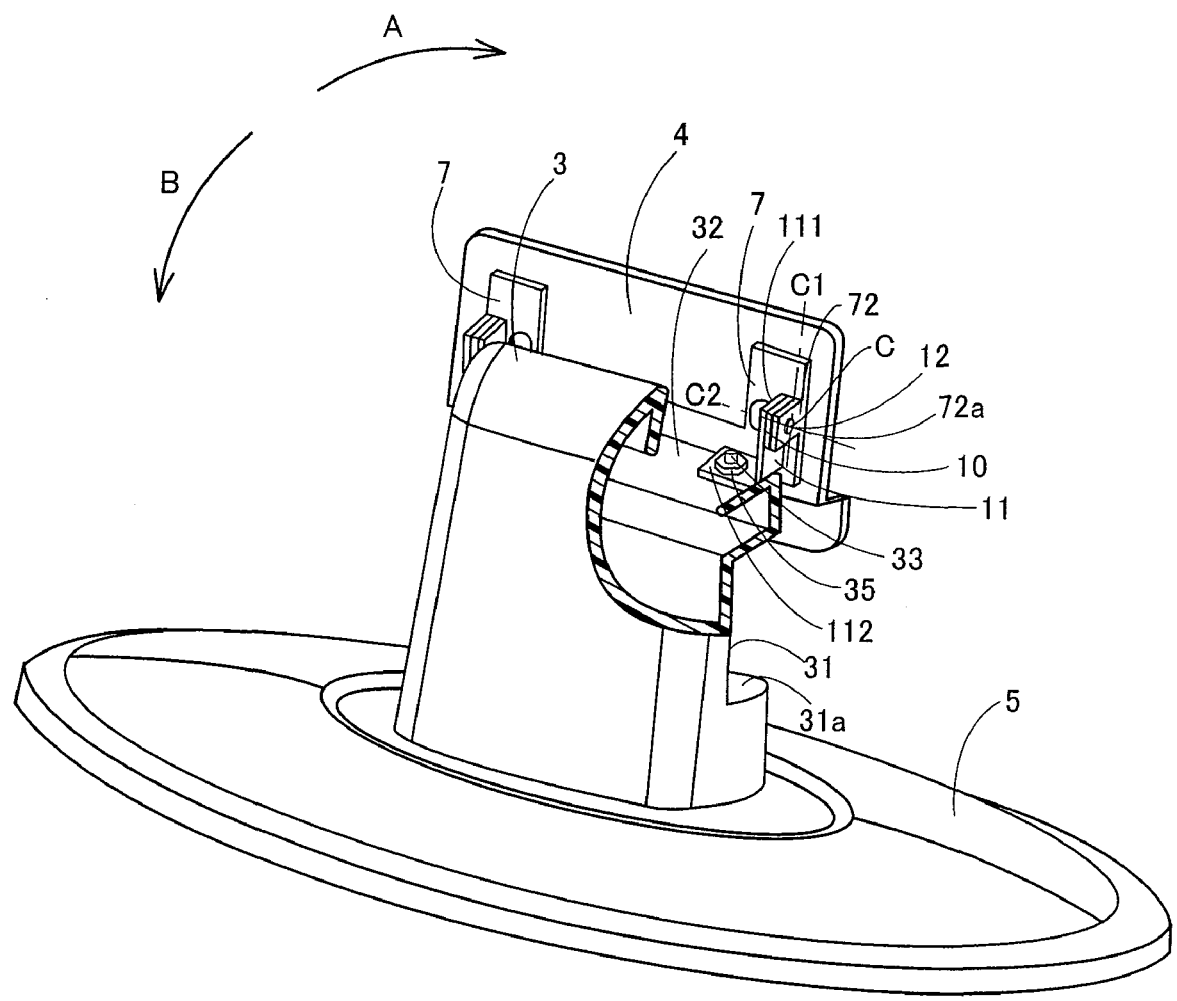
FIG. 4 is a perspective view showing a support member and a base member of the liquid crystal television set according to the embodiment of the present invention.

As shown in FIG. 4, the projecting portions 72 of the sheet metal member 7, disc springs 10 and first ends 111 of L-shaped mounting members 11 are held by shafts and nuts (not shown). At this time, the sheet metal member 7 is held to be rotatable with respect to the mounting members 11 about the shafts 12 serving as an axis of rotation. Second ends 112 of the mounting members 11 are fixedly mounted on the fixed member mounting portions 33 of the base member 3 by fastening members 35. According to this embodiment, the support member 4 is so formed as to support the cabinet 1 on the side of the front surface (along arrow Y1) of the base member 3 to be rotatable along arrow A or along arrow B with respect to the base member 3, as shown in FIGS. 3 and 4. More specifically, the cabinet 1 is rotatable in an anteroposterior direction (along arrow A or along arrow B) about the shafts 12, serving as rotation centers C (central points C where central lines C1 and C2 intersect with each other), inserted into the rotating shaft receiving holes 72a of the projecting portions 72 of the sheet metal member 7, as shown in FIGS. 4 and 10 to 15. The rotation centers C are provided above (on the side along arrow Z1) a bottom 1c of the cabinet 1, as shown in FIGS. 10 to 15.

Figure 11:
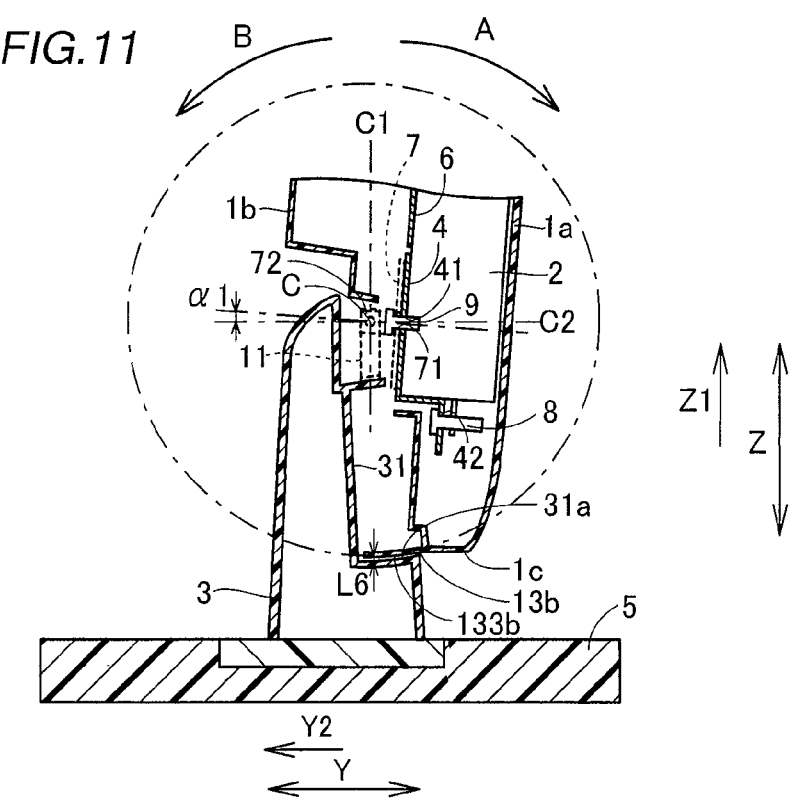
Figure 13:
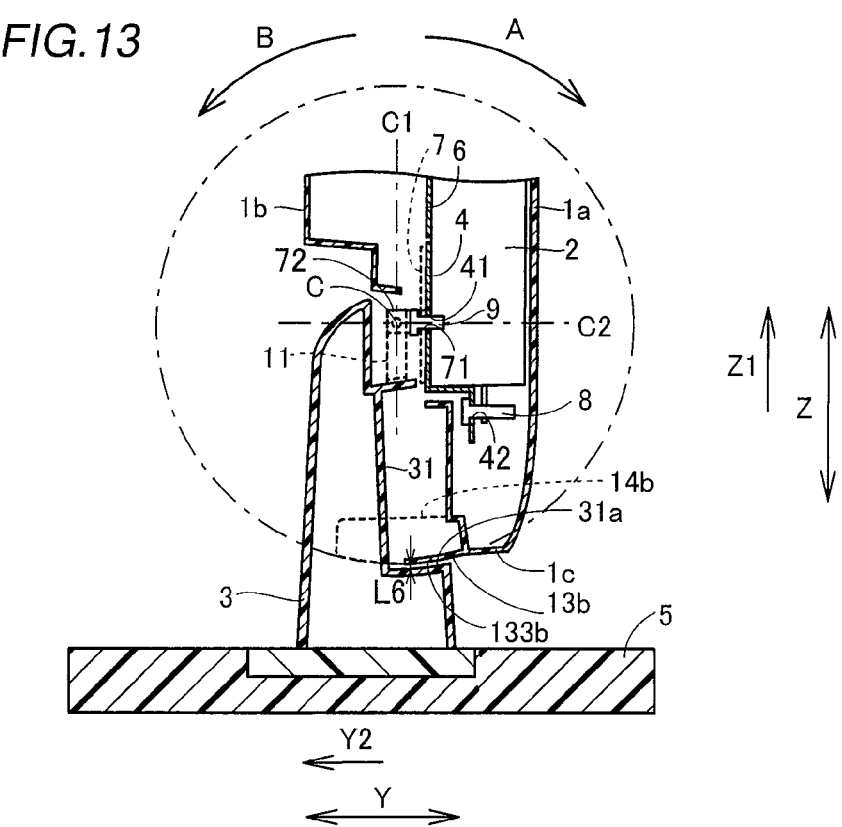
Figure 14:
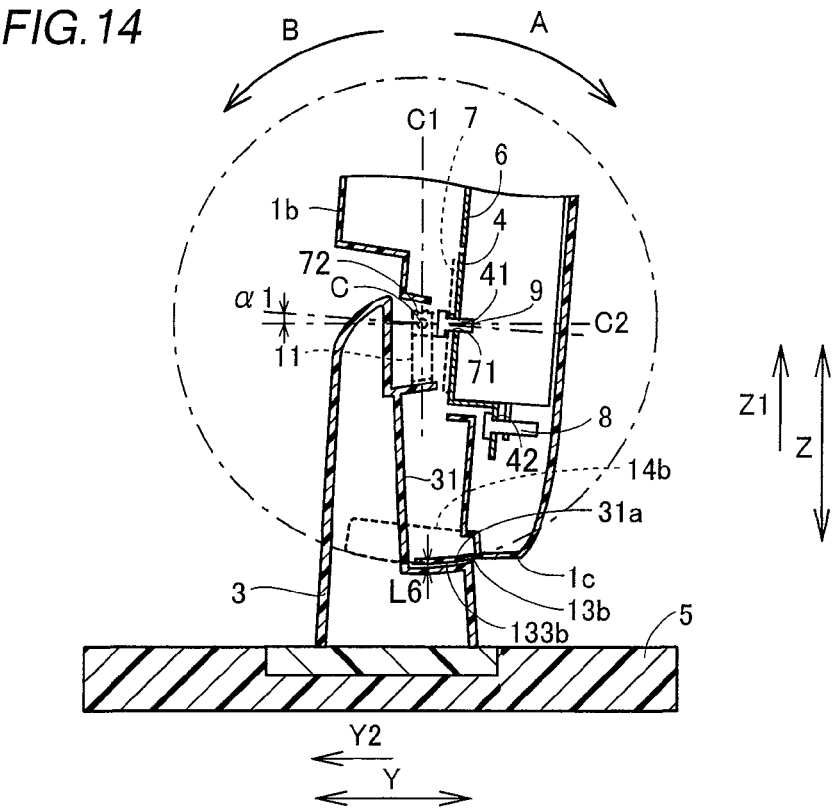

According to this embodiment, when the cabinet 1 is inclined forward (along arrow A), the rib portion 13b is fitted on the lower surface portion 31a, corresponding to the rib portion 13b, of the recess portion 31 in the forward inclining rotational range (angle $\alpha 1 = 2.5$ degrees in this embodiment) of the cabinet 1, so that a horizontal clearance (in the directions X and Y) formed between the cabinet 1 and the base member 3 is substantially blocked up, as shown in FIGS. 11 and 14. According to this embodiment, the rib portions 14b of the cabinet 1 are so formed as to block up clearances formed on the lateral portions of the recess portion 31 (sides of the recess portion 31 in the direction X), as shown in FIG. 13.

Figure 12:
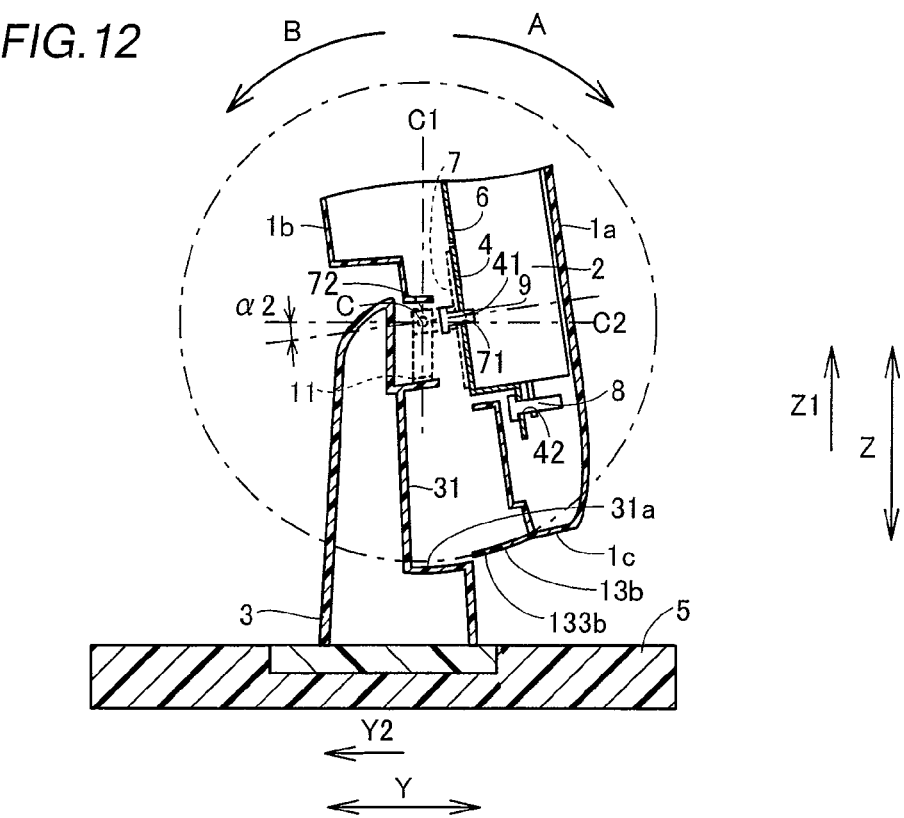
Figure 15:
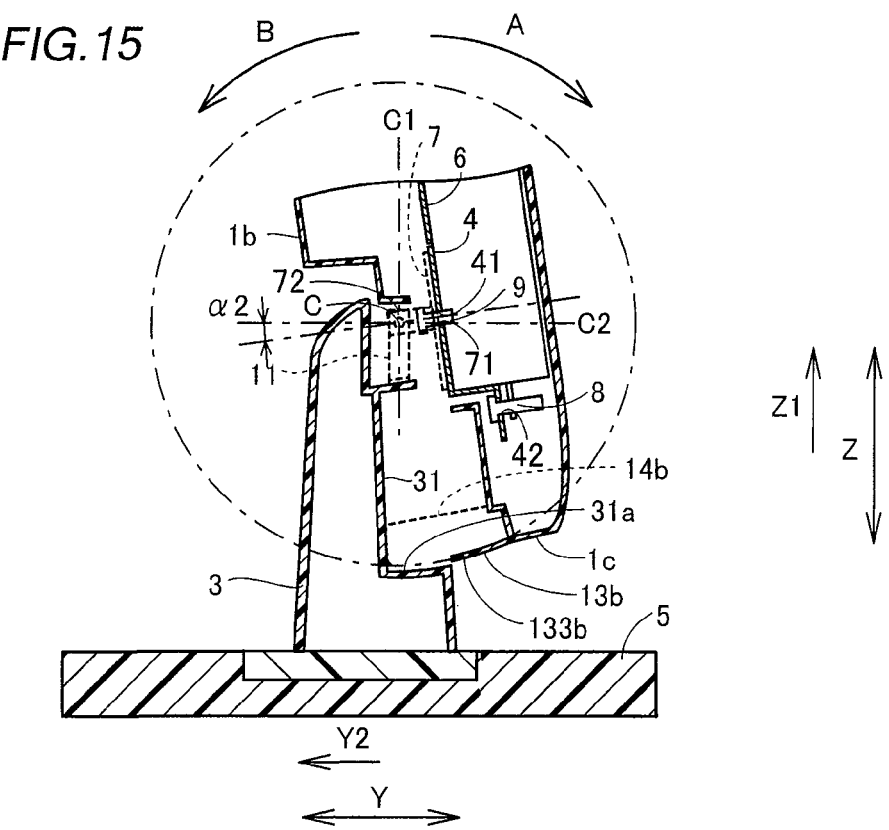

According to this embodiment, when the cabinet 1 is inclined backward (along arrow B), the rib portion 13b is located in the vicinity of the lower surface portion 31a, corresponding to the rib portion 13b, of the recess portion 31 in the backward inclining rotational range (angle $\alpha 2 =$ about 10 degrees in this embodiment) of the cabinet 1, so that the horizontal clearance (in the directions X and Y) formed between the cabinet 1 and the base member 3 is substantially blocked up, as shown in FIGS. 12 and 15. According to this embodiment, the rib portions 14b of the cabinet 1 are so formed as to block up the clearances formed on the lateral portions of the recess portion 31 (lateral portions of the recess portion 31 in the direction X), as shown in FIG. 15.

Rotation of the liquid crystal television set 100 according to the embodiment of the present invention will be now described with reference to FIGS. 10 to 15.

Figure 10:
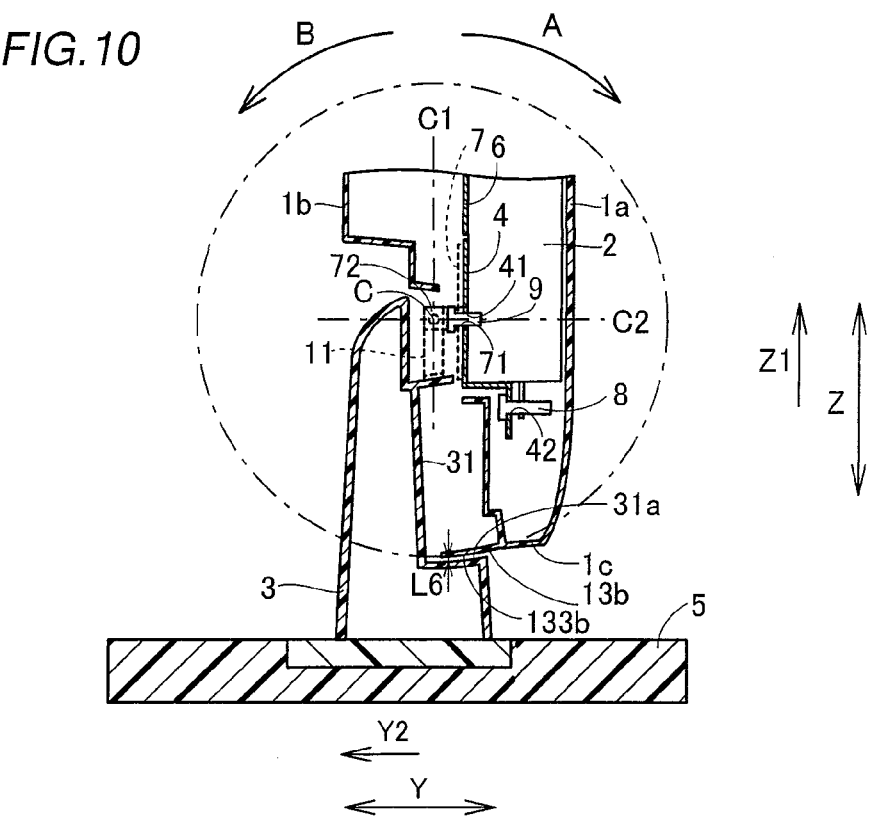
FIGS. 10 to 15 are sectional views for illustrating rotation of the liquid crystal television set according to the embodiment of the present invention.

First, a user presses the cabinet 1 along arrow A (forward) from a state where the cabinet 1 is vertically supported shown in FIGS. 10 and 13. In this case, the cabinet 1 is rotated along arrow A (forward) with respect to the base member 3 about the rotation centers C of the shafts 12 inserted into the rotating shaft receiving holes 72a of the sheet metal member 7 of the support member 4 mounted on the cabinet 1. When the cabinet 1 is rotated by about 2.5 degrees (angle $\alpha 1$), rotation of the cabinet 1 along arrow A is stopped as shown in FIGS. 11 and 14. Thus, the display portion 2 of the liquid crystal television set 100 is in a downward (forward inclining) state by about 2.5 degrees. At this time, the rib portion 13b is fitted on the lower surface portion 31a, corresponding to the rib portion 13b, of the recess portion 31, whereby the horizontal clearance (in the directions X and Y) formed between the cabinet 1 and the base member 3 is substantially blocked up. Further, the rib portions 14b of the cabinet 1 substantially block up the clearances formed on the lateral portions of the recess portion 31 (sides of the recess portion 31 in the direction X), as shown in FIG. 13. Thus, the clearances formed on the sides of the recess portion 31 (lateral portions of the recess portion 31 in the direction X) do not substantially exist, and hence the user's finger can be prevented from being caught.

The user presses the cabinet 1 along arrow B (backward) from the state where the cabinet 1 is vertically supported shown in FIGS. 10 and 13. In this case, the cabinet 1 is rotated along arrow B (backward) with respect to the base member 3 about the shafts 12, serving as the rotation centers C, inserted into the rotating shaft receiving holes 72a of the sheet metal member 7 of the support member 4 mounted on the cabinet 1. When the cabinet 1 is rotated by about 10 degrees (angle $\alpha 2$), rotation of the cabinet 1 along arrow B is stopped as shown in FIGS. 12 and 15. Thus, the display portion 2 of the liquid crystal television set 100 is in an upward state by about 10 degrees. At this time, the rib portion 13b is located in the vicinity of the lower surface portion 31a, corresponding to the rib portion 13b, of the recess portion 31, whereby the horizontal clearance (in the directions X and Y) formed between the cabinet 1 and the base member 3 is substantially blocked up. Further, the rib portions 14b of the cabinet 1 substantially block up the clearances formed on the lateral portions of the recess portion 31 (sides of the recess portion 31 in the direction X), as shown in FIG. 15. Thus, the clearances formed on the lateral portions of the recess portion 31 (sides of the recess portion 31 in the direction X) do not substantially exist, and hence the user's finger can be prevented from being caught.

According to this embodiment, as hereinabove described, the horizontal clearance (in the direction X or Y) formed between the cabinet 1 and the base member 3 is substantially blocked up in the anteroposterior rotational range (along arrow A or B) of the cabinet 1 (angle $\alpha 1$+angle $\alpha 2 = 12.5$ degrees in this embodiment) by the rib portion 13b and the recess portion 31, whereby no clearance is substantially formed between the rib portion 13b and the front surface of the base member 3 when the user rotates the cabinet 1 in the anteroposterior direction (along arrow A or B) with respect to the base member 3, also in a case where the rotation centers C of the cabinet 1 are located above the bottom of the cabinet 1. Thus, the user's finger is not erroneously caught between the rib portion 13b and the front surface of the base member 3, and hence the finger can be inhibited from being caught in the clearance formed between the cabinet 1 and the base member 3 when rotating the cabinet 1 in the anteroposterior direction (along arrow A or B) with respect to the base member 3.

According to this embodiment, as hereinabove described, the horizontal clearance formed between the cabinet 1 and the base member 3 is substantially blocked up by fitting the rib portion 13b into the recess portion 31 when the cabinet 1 is inclined forward, and the horizontal clearance (direction X or Y) formed between the cabinet 1 and the base member 3 is substantially blocked up by locating a forward end of the rib portion 13b in the vicinity of the lower edge of the recess portion 31 on the side of the rib portion 13b when the cabinet 1 is inclined backward, whereby the clearance can be easily inhibited from substantial formation between the rib portion 13b and the front surface of the base member 3 when the user rotates the cabinet 1 backward (along arrow B) with respect to the base member 3, also in a case where the rotation centers C of the cabinet 1 are located above the bottom 1c of the cabinet 1.

According to this embodiment, as hereinabove described, the mounting portions 33 for mounting the support member 4 is formed on the upper surface of the projecting portion 32 constituting the upper portion of the recess portion 31 of the base member 3, whereby the cabinet 1 can be easily mounted on the base member 3 through the support member 4.

According to this embodiment, as hereinabove described, the horizontal clearance (direction X or Y) formed between the cabinet 1 and the base member 3 is blocked up by fitting the rib portion 13b on the lower surface portion 31a, corresponding to the rib portion 13b, of the recess portion 31 in the anteroposterior rotational range (along arrow A or B) of the cabinet 1 (angle α1+angle α2=12.5 degrees in this embodiment) when the cabinet 1 is inclined forward (along arrow A), and the horizontal clearance (direction X or Y) formed between the cabinet 1 and the base member 3 is substantially blocked up by locating the forward end of the rib portion 13b in the vicinity of the lower surface portion 13a of the rib portion 13b of the recess portion 31 in the anteroposterior rotational range (along arrow A or B) of the cabinet 1 (angle α1+angle α2=12.5 degrees in this embodiment) when the cabinet 1 is inclined backward (along arrow B), whereby the clearance can be easily inhibited from substantial formation between the forward end of the rib portion 13b and the vicinity of the lower edge of the recess portion 31 on the side of the rib portion 13b when the user rotates the cabinet 1 backward (along arrow B) with respect to the base member 3, also in a case where the rotation centers C of the cabinet 1 are located above the bottom 1c of the cabinet 1.

According to this embodiment, as hereinabove described, the rib portion 13b of the cabinet 1 is arcuately formed in the vicinity of the bottom 1 of the cabinet 1, and the lower surface portion 31a, corresponding to the rib portion 13b, of the recess portion 31 of the base member 3 is arcuately formed, whereby the rib portion 13b can be smoothly rotated with respect to the lower surface portion 31a, corresponding to the rib portion 13b, of the recess portion 31 in a state where the rib portion 13b and the lower surface portion 31a corresponding to the rib portion 13b are separated from each other at a prescribed interval when the cabinet 1 is rotated with respect to the base member 3.

According to this embodiment, as hereinabove described, the rib portion 13b and the lower surface portion 31a, corresponding to the rib portion 13b, of the recess portion 31 are formed so as not to come into contact with each other in the anteroposterior rotational range (along arrow A or B) of the cabinet 1 (angle α1+angle α2=12.5 degrees in this embodiment), whereby frictional resistance can be inhibited from occurring between the rib portion 13b and the lower surface portion 31a, corresponding to the rib portion 13b, of the recess portion 31 as compared with a case where the rib portion 13b and the lower surface portion 31a, corresponding to the rib portion 13b, of the recess portion 31 are in contact with each other, and hence the rib portion 13b can be smoothly rotated with respect to the lower surface portion 31a, corresponding to the rib portion 13b, of the recess portion 31.

According to this embodiment, as hereinabove described, the base member 3 provided with the recess portion 31 is mounted on the leg portion 5, whereby the base member 3 provided with the recess portion 31 can be stably set by the flat leg portion 5.

According to this embodiment, as hereinabove described, the rib portions 14b are so formed as to block up the clearance formed on the lateral portions (in the direction X) of the recess portion 31 in the anteroposterior rotational range (along arrow A or B) of the cabinet 1 (angle α1+angle α2=12.5 degrees in this embodiment), whereby no clearance is formed not only between the lower surface portion 31a of the recess portion 31 and the rib portion 13b but also lateral portions (in the direction X) of the recess portion 31 when the user rotates the cabinet 1 in the anteroposterior direction (along arrow A or B). Thus, the finger can be inhibited from being caught in the clearance formed on the lateral portions (in the direction X) of the recess portion 31 when the user rotates the cabinet 1 in the anteroposterior direction (along arrow A or B).

According to this embodiment, as hereinabove described, the clearances formed on the lateral portions of the recess portion 31 are blocked up by covering the lateral portions of the recess portion 31 by the rib portions 14b in the anteroposterior rotational range (along arrow A or B) of the cabinet 1 when the cabinet 1 is inclined forward, and the clearances formed on the lateral portions of the recess portion 31 are blocked up by locating the ends of the rib portions 14b in the vicinity of the end of the recess portion 31 in a width direction (direction X) in the anteroposterior rotational range (along arrow A or B) of the cabinet 1 when the cabinet 1 is inclined backward, whereby the rib portions 14b can easily inhibit clearances from formation on the lateral portions of the recess portion 31 when the user rotates the cabinet 1 in the anteroposterior direction (along arrow A or B) with respect to the base member 3.

According to this embodiment, as hereinabove described, the inner side surfaces of the rib portions 14b and the lateral portions, covered by the rib portions 14b, of the recess portion 31 are formed so as not to come into contact with each other in the anteroposterior rotational range (along arrow A or B) of the cabinet 1, whereby frictional resistance can be inhibited from occurring between the inner side surfaces of the rib portions 14b and the lateral portions, covered by the rib portions 14b, of the recess portion 31 as compared with a case where the inner side surfaces of the rib portions 14b and the lateral portions, covered by the rib portions 14b, of the recess portion 31 are in contact with each other, and hence the rib portions 14b can be smoothly rotated with respect to the lateral portions, covered by the rib portions 14b, of the recess portion 31.

According to this embodiment, as hereinabove described, the length L4 of the recess portion 31 in the width direction (direction X) is smaller than the length L5 between the rib portions 141b and 142b formed on the first and second ends of the rib portion 13b, whereby the inner side surfaces of the rib portions 14b and the lateral portions, covered by the rib portions 141b and 142b, of the recess portion 31 do not come into contact with each other, and hence the rib portions 141b and 142b can be smoothly rotated with respect to the lateral portions, covered by the rib portions 14b, of the recess portion 31.

According to this embodiment, as hereinabove described, the lower portions (141c and 142c) of the forward ends of the rib portions 14b are rounded, whereby it is possible to suppress that the user is injured when touching the rib portions 14b as compared with a case where the lower portions (141c and 142c) of the forward ends of the rib portions 14b are formed in angular shapes.

According to this embodiment, as hereinabove described, the rib portions 14b are so formed as to block up the clearances formed on the lateral portions of the recess portion 31 in the anteroposterior rotational range (along arrow A or B) of the cabinet 1, whereby the rib portions 14b can easily inhibit the clearances from formation on the lateral portions of the recess portion 31.

According to this embodiment, as hereinabove described, the rib portions 14b are so formed as to protrude vertically downward (along arrow Z1) from the lower surface of the cabinet 1, whereby the clearance can be inhibited from formation between the lower surface of the cabinet 1 and the vicinity of the lateral portions of the recess portion 31.

Although the present invention has been described and illustrated in detail, it is clearly understood that the same is by way of illustration and example only and is not to be taken by way of limitation, the spirit and scope of the present invention being limited only by the terms of the appended claims.

For example, while the projecting portions and the recess portion are provided on the liquid crystal television set employed as an exemplary display of the present invention in the aforementioned embodiment, the present invention is not restricted to this but the projecting portions and the recess portion may alternatively be provided on a display such as an organic EL display or a plasma panel display other than the liquid crystal television set.

While the housing has the projecting portions and the base member has the recess portion in the aforementioned embodiment of the present invention, the present invention is not restricted to this but the housing alternatively may has the recess portion and the base member alternatively may has the projecting portions.

While the projecting portions are formed by the rib portions in the aforementioned embodiment of the present invention, the present invention is not restricted to this but the projecting portion may alternatively be formed by portions other than the rib portions and the portions formed by the projecting portion may be formed to be fitted on the recess portions.

While the projecting portions are integrally formed with the housing in the aforementioned embodiment of the present invention, the present invention is not restricted to this but the projecting portions can alternatively be provided independently of the housing.

While the housing is rotated in the angle range of about 12.5 degrees (backward inclining of about 10 degrees and forward inclining of about 2.5 degrees) in the aforementioned embodiment of the present invention, the present invention is not restricted to this but the housing may alternatively be rotated in the angle range other than about 12.5 degrees (backward inclining of about 10 degrees and forward inclining of about 2.5 degrees).

What is claimed is:
1. A display comprising:
a housing provided with a display portion; and
a base member, wherein
one of said housing and said base member has a projecting portion,
the other of said housing and said base member has a recess portion formed to be fitted with said projecting portion,
said housing is formed rotatably in an anteroposterior direction with respect to said base member about a rotation center provided above a bottom of said housing,
said projecting portion and said recess portion are so formed as to substantially block a horizontal clearance formed between said housing and said base member in an anteroposterior rotational range of said housing,
said projecting portion is integrally provided on said housing and includes a first rib portion protruding toward said base member,
said recess portion is provided on said base member so as to be fitted with said first rib portion of said housing,
the horizontal clearance formed between said housing and said base member is blocked by fitting said first rib portion into a portion, corresponding to said first rib portion, of said recess portion in the anteroposterior rotational range of said housing when said housing is inclined forward, and
the horizontal clearance formed between said housing and said base member is substantially blocked by locating a forward end of said first rib portion in the vicinity of a lower edge of said recess portion on a side of said first rib portion in the anteroposterior rotational range of said housing when said housing is inclined backward,
said projecting portion further includes a second rib portion integrally provided with said housing and protruding in a direction perpendicular to said first rib portion, and
said second rib portion is so formed as to block a clearance formed on a lateral portion of said recess portion in the anteroposterior rotational range of said housing.

2. The display according to claim 1, wherein
said first rib portion of said housing is arcuately formed in an area near said bottom of said housing, and
a lower surface portion, corresponding to said first rib portion, of said recess portion of said base member is arcuately formed.

3. The display according to claim 1, wherein
said first rib portion and a lower surface portion, corresponding to said first rib portion, of said recess portion are formed so as not to come into contact with each other in the anteroposterior rotational range of said housing.

4. The display according to claim 1, further comprising a flat leg portion, wherein
said base member provided with said recess portion is mounted on said leg portion.

5. The display according to claim 1, wherein
the clearance formed on the lateral portion of said recess portion is blocked by covering the lateral portion of said recess portion in the anteroposterior rotational range of said housing by said second rib portion when said housing is inclined forward, and
the clearance formed on the lateral portion of said recess portion is blocked by locating an end of said second rib portion in the vicinity of an end of said recess portion in a width direction in the anteroposterior rotational range of said housing when said housing is inclined backward.

6. The display according to claim 1, wherein
an inner side surface of said second rib portion and the lateral portion covered by said second rib portion of said recess portion are formed so as not to come into contact with each other in the anteroposterior rotational range of said housing.

7. The display according to claim 1, wherein
a length of said recess portion in a width direction is smaller than a length between two of said second rib portions formed on first and second ends of said first rib portion respectively.

8. The display according to claim 1, wherein a lower portion of a forward end of said second rib portion is rounded.

9. The display according to claim 1, wherein the lateral portion of said recess portion is opened, and said second rib portion is so formed as to block the clearance formed on the opened lateral portion of said recess portion in the anteroposterior rotational range of said housing.

10. The display according to claim 1, wherein said second rib portion is so formed as to protrude vertically downward from a lower surface of said housing.

11. The display according to claim 10, wherein said second rib portion and said lower surface of said housing form an L-shape.

12. A display comprising:
a housing provided with a display portion; and
a base member, wherein
one of said housing and said base member has a projecting portion,
the other of said housing and said base member has a recess portion formed to be fitted with said projecting portion,
said housing is formed rotatably in an anteroposterior direction with respect to said base member about a rotation center provided above a bottom of said housing,
said projecting portion and said recess portion are so formed as to substantially block a horizontal clearance formed between said housing and said base member in an anteroposterior rotational range of said housing,
a support member supporting said housing on a side of a front surface of said base member to be rotatable with respect to said base member, wherein
the horizontal clearance formed between said housing and said base member is blocked by fitting said projecting portion into said recess portion when said housing is inclined forward,
the horizontal clearance formed between said housing and said base member is substantially blocked by locating a forward end of said projecting portion in an area near a lower edge of said recess portion on a side of said projecting portion when said housing is inclined backward; and
a mounting portion for mounting said support member is formed on an upper surface of a protrusion constituting an upper portion of said recess portion of said base member.

* * * * *